United States Patent [19]
Rendall et al.

[11] Patent Number: 5,871,571
[45] Date of Patent: *Feb. 16, 1999

[54] INKS AND UV-OPAQUE PROTECTORANTS COMPRISING BASIC SODIUM AND/OR SODIUM/POTASSIUM ALUMINUM SULFATES AND PROCESS FOR MAKING SUCH COMMERCIAL PRODUCTS

[75] Inventors: John S. Rendall; Massoud Ahghar, both of Albuquerque, N. Mex.; David H. Fishman, Berkeley Heights, N.J.

[73] Assignee: SOLV-EX Corporation, Albuquerque, N. Mex.

[*] Notice: The term of this patent shall not extend beyond the expiration date of Pat. No. 5,783,163.

[21] Appl. No.: 892,524

[22] Filed: Jul. 14, 1997

[51] Int. Cl.⁶ .............................. C01F 7/74; C09D 11/00
[52] U.S. Cl. .................. 106/31.27; 23/302 R; 23/305 A; 106/316; 423/556
[58] Field of Search .............................. 23/302 R, 302 T, 23/305 A; 423/544, 551, 556; 106/31.13, 31.27, 31.9, 31.6

[56] References Cited

U.S. PATENT DOCUMENTS

| | | | |
|---|---|---|---|
| 82,747 | 10/1868 | Pemberton | 423/556 |
| 3,193,345 | 7/1965 | Marsh | 23/305 A |
| 4,563,342 | 1/1986 | Gunnarsson et al. | 423/556 |
| 5,783,163 | 7/1998 | Rendall et al. | 423/556 |

FOREIGN PATENT DOCUMENTS

| | | | |
|---|---|---|---|
| 723085 | 12/1965 | Canada | 423/556 |
| 399195 | 10/1942 | Italy | 423/556 |

*Primary Examiner*—Gary P. Straub
*Assistant Examiner*—Timothy C. Vanoy
*Attorney, Agent, or Firm*—Thomas E. Schatzel; Law Offices of Thomas E. Schatzel, A Prof. Corporation

[57] ABSTRACT

A process for making ink which begins with a leach liquor of $Al_2(SO_4)_3+K_2SO_4+Fe_2SO_4$ and other sulfates that are introduced to a surface-cooled crystallizer that drops the $Al_2(SO_4)_3+18H_2O$ which is removed from the leach liquor. The leach liquor is then supplied with a mixture which includes $K_2SO_4$ into a simple crystallization and evaporation unit to drop $Al_2(SO_4)_3+K_2SO_4+24H_2O$. A pressure of 250 PSI and a temperature of 200° C. are then applied in a discrete continuous process that yield a basic sodium or sodium/potassium aluminum sulfate and excess sodium sulfate or sodium/potassium. The excess sodium sulfate or sodium/potassium sulfate is returned to the simple crystallization and evaporation unit. The basic potassium aluminum sulfate (BKAS) and/or basic sodium aluminum sulfate (BNaAS) $Na_2SO_4, 3Al_2O_3, 4SO_3, 9H_2O$ is used as a filler in the making of ink.

5 Claims, 2 Drawing Sheets

INKS AND UV-OPAQUE PROTECTORANTS COMPRISING BASIC SODIUM AND/OR SODIUM/POTASSIUM ALUMINUM SULFATES AND PROCESS FOR MAKING SUCH COMMERCIAL PRODUCTS

BACKGROUND OF THE INVENTION

1. Field of the Invention

The invention relates generally to printing ink compositions and specifically to methods for producing printing ink compositions comprising basic potassium aluminum sulfate (BKAS) and/or basic sodium aluminum sulfate (BNaAS) as a pigment or filler.

2. Description of the Prior Art

Various inorganic compounds are used in printing inks as opacifying pigments including titanium dioxide, calcium carbonate, clay, zinc oxide, baryte, barium sulfate, aluminum hydrate, talc, silica, etc. Such are also conventionally used as extender pigments in printing inks. But these materials vary in cost, opacity, and pH stability, when used in printing inks.

Many of the inorganic materials used as filler and colorants in printing inks are mined. So the particle size, its size distribution, and the surface chemistry and physics are hard to control without post-mining treatments that can add significant cost.

SUMMARY OF THE PRESENT INVENTION

It is therefore an object of the present invention to provide a substitute material for titanium dioxide filler in the making of ink.

It is a further object of the present invention to provide an efficient process for making printing ink containing basic sodium/potassium aluminum sulfate made from leach liquors of various sulfates.

It is another object of the present invention to provide a process for making fillers, extended fillers and/or pigments in the making of ink with basic sodium/potassium aluminum sulfate.

Briefly, a process embodiment of the present invention for making ink begins with a leach liquor of $Al_2(SO_4)_3+K_2SO_4+Fe_2SO_4$ and other sulfates that are introduced to a surface-cooled crystallizer that drops the $Al_2(SO_4)_3+18H_2O$. The leach liquor is pumped through a heat exchanger that keeps a temperature of 160° F. and the surface temperature of the surface-cooled crystallizer is maintained at 60° F. The temperature gradient within the leach liquor promotes crystal formation. These crystals are then supplied to a mixture which includes $K_2SO_4$ in a simple crystallization and evaporation step that uses a vacuum of twenty inches of mercury and heat to drop $Al_2(SO_4)_3+K_2SO_4+24H_2O$. A pressure of 250 PSI and a temperature of 200° C. are then applied in a discrete continuous process that yields a basic sodium/potassium aluminum sulfate and excess sodium/potassium sulfate. The excess sodium/potassium sulfate is returned to the simple crystallization and evaporation step. The basic sodium/potassium aluminum sulfate comprises particles that are at least forty percent below two micron. This is then applied to a delaminator that converts all the particles to under ten micron to submicron size if needed for various filler or pigment substitutes.

An advantage of the present invention is that a method is provided to produce an alternative to titanium dioxide filler and extender filler that is ninety-nine percent insoluble in the range of 2–10 pH.

Another advantage of the present invention is that a titanium dioxide filler and extender filler substitute is provided with a particle size which is particularly important for thin film printing inks, e.g., under two microns.

Another advantage of the present invention is that a titanium dioxide filler and extender filler substitute is provided for reflecting at least twenty percent of light over the entire visible light region of 400–700 nanometers wavelength. The basic sodium/potassium aluminum sulfate (BNaAS or BKAS) has 3600–3900 $cm^2/g$ light scattering coefficient, which should increase significantly with further delamination. These characteristics provide an opaque white hue over the entire visible light spectrum of 400–700 nanometers.

A further advantage of the present invention is that the use of basic potassium aluminum sulfate (BKAS) and/or basic sodium aluminum sulfate (BNaAS) allows very easy dispersion of materials in ink without the need for high energy and long dispersion time, which is in stark contrast to other pigment materials.

These and other objects and advantages of the present invention will no doubt become obvious to those of ordinary skill in the art after having read the following detailed description of the preferred embodiments that are illustrated in the drawing figure.

IN THE DRAWINGS

FIG. 1 is a diagram of a process for producing basic sodium/potassium aluminum sulfate from sulfate leach liquors; and FIG. 2 is a diagram of a process for making printing inks with fillers of basic sodium/potassium aluminum sulfate from sulfate leach liquors that partially or completely eliminate titanium dioxide in the filler.

DETAILED DESCRIPTION OF THE PREFERRED EMBODIMENT

Figure 1:
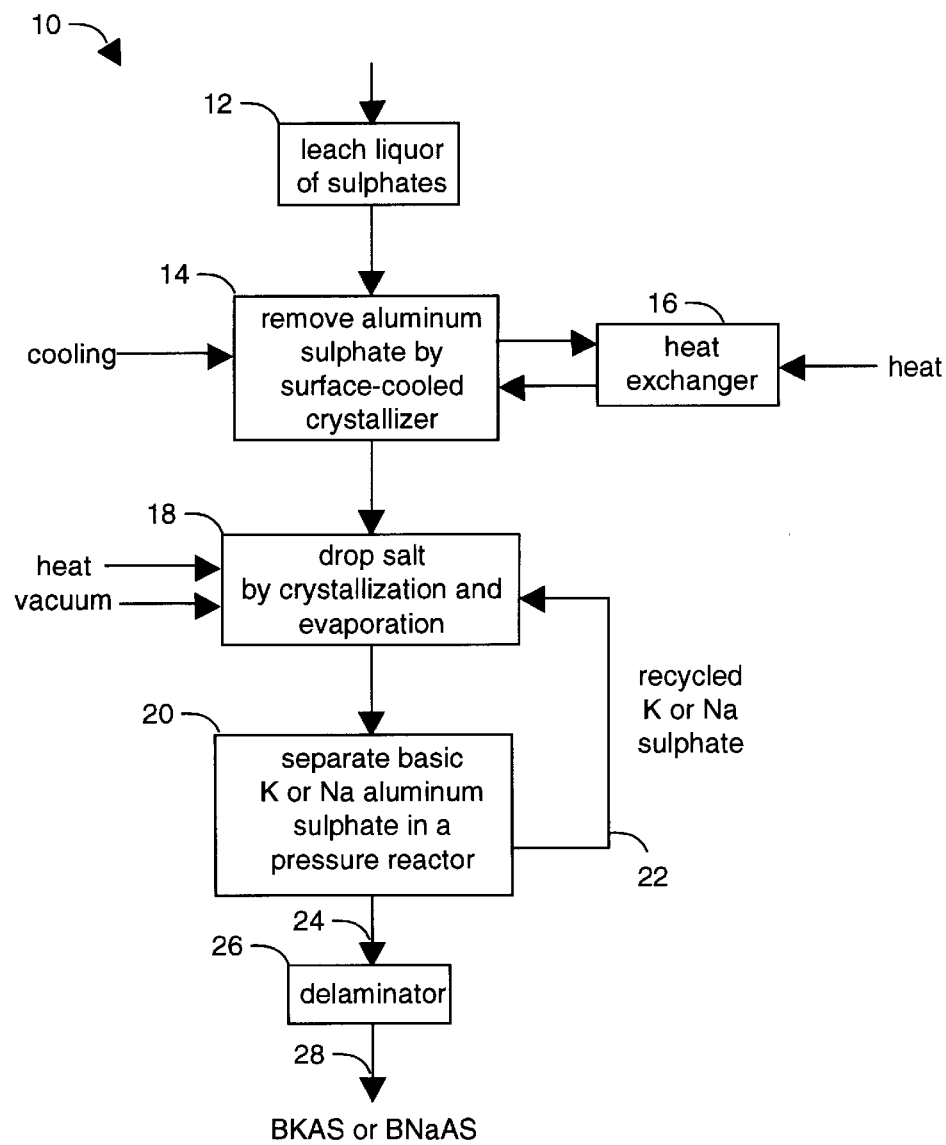

The printing ink embodiments of the present invention have a range of viscosity from one to 150,000 centipoises, i.e., from a very low viscosity easy flowing ink, to a very high viscosity paste type composition. Inks comprising basic sodium/potassium aluminum sulfate (BNaAS or BKAS) and/or basic sodium aluminum sulfate (BNaAS) can be applied to a variety of surfaces, including, but not limited to, unmodified or treated ink, paper, board, polymer film, metal, glass, or other substrates. They can be applied by a variety of methods, including impact and non-impact printing, metal decorating, and coating techniques such as flexography, gravure, intaglio, lithography, letterpress, roller coating, screen printing, electrostatic or other electronic methods, ink jet, etc. Once the applied ink is dried or cured, the critical component of embodiments of the present invention, either basic potassium aluminum sulfate (BKAS) and/or basic sodium aluminum sulfate (BNaAS), functions to provide opacity to the ink film or coating on the printed surface. Therefore printing ink embodiments of the present invention may be comprised of colorants, polymers, solvents, and additives.

In a preferred embodiment of the present invention, particles under two microns of basic potassium aluminum sulfate (BKAS) and/or basic sodium aluminum sulfate are the key component of a colorant. Such provide opacity as a full or partial alternate to titanium dioxide or other opacifying pigment. And these can also be used as an extender pigment in combinations with other inorganic or organic pigments.

Typical inorganic opacifying pigments, which also can be used as extender pigments in printing inks include, but are not limited to, titanium dioxide, calcium carbonate, clay, zinc oxide, baryte, barium sulfate, aluminum hydrate, talc, silica, and others. The use of basic potassium aluminum sulfate (BKAS) and/or basic sodium aluminum sulfate (BNaAS) as a total or partial replacement for these materials in printing inks provides the benefits of low cost, opacity, and pH stability. Many of the inorganic materials listed above are mined. Since the basic potassium aluminum sulfate (BKAS) and basic sodium aluminum sulfate (BNaAS) materials are manufactured rather than mined, they can be engineered to have controlled particle size, controlled particle size distribution, and controlled surface chemistry and physics as a result of further treatments.

The basic potassium aluminum sulfate (BKAS) and/or basic sodium aluminum sulfate (BNaAS) can also be used in combination with a variety of inorganic, metallic, and organic pigments in printing inks, including but not limited to those described in the NPIRI Raw Material Data Handbook, Volume 4, Pigments. This is published by the National Printing Ink Research Institute of the National Association of Printing Ink Manufacturers. The same benefits of opacity, low cost, and stability listed above are benefits of the use of basic potassium aluminum sulfate (BKAS) and/or basic sodium aluminum sulfate (BNaAS) with the inorganic, metallic, and organic pigments of this citation. Another benefit is reduced heavy metal content in the extended pigment, and the ink, when basic potassium aluminum sulfate (BKAS) and/or basic sodium aluminum sulfate (BNaAS) is used in combination with pigments comprising heavy metals such as lead, chrome, cadmium, mercury, or the like. This offers obvious environmental benefits.

Other printing ink colorant use of basic potassium aluminum sulfate (BKAS) and/or basic sodium aluminum sulfate include compositions where these materials are used in combination with fluorescent materials, dyes, and similar materials. In these cases, the basic potassium aluminum sulfate (BKAS) and basic sodium aluminum sulfate (BNaAS) primarily function to provide opacity.

While the focus for the present invention is for an opaque form of basic potassium aluminum sulfate (BKAS) and/or basic sodium aluminum sulfate (BNaAS) in printing inks, it should be recognized that a non-opacifying form can also be produced with novel and useful applications.

When the particle size of the basic potassium aluminum sulfate (BKAS) and/or basic sodium aluminum sulfate (BNaAS) is below the wavelength of visible light, these materials can be incorporated into a range of materials having the composition of printing inks, namely colorants, polymers, solvents, and additives. Alternatively, there could be one or two of the components of inks absent. In the applications where basic potassium aluminum sulfate (BKAS) and/or basic sodium aluminum sulfate (BNaAS) of particle size lower than the wavelength of visible light is used, it does not provide opacity but does reflect lower (than visible) wavelength light, particularly ultraviolet light. This would provide protection from harmful ultraviolet rays to the ink or coating comprising this low particle size, non-opacifying form of, basic potassium aluminum sulfate (BKAS) and/or basic sodium aluminum sulfate (BNaAS) or to the substrate on which the ink or coating is applied. Typical applications for such a non-opacifying form of basic potassium aluminum sulfate (BKAS) and/or basic sodium aluminum sulfate (BNaAS) include sun screen lotions, protective lipstick and cosmetics, coating for automotive applications, outdoor signage, etc.

Polymers are typically used in printing inks, metal decorating inks and coatings, and other coating applications. These include polymers suitable for use in paste or liquid compositions, in water or solvent based systems, in reactive or non-reactive systems, and others, as well as in combinations of these systems. Such reactive systems include the use of radiation, chemical curing, etc.

In a typical application, the basic potassium aluminum sulfate (BKAS) and/or basic sodium aluminum sulfate (BNaAS) is dispersed in a polymer/solvent combination using a mixer or other dispersing devise. Other ink components such as monomers, plasticizers, etc., can also be used. Such mixers and dispersers can include "Cowles" type dispersers, sand mills, small media mill such as produced by Netzsch or similar mill, a rotor/stator kinetic dispersion type mill, a two roll mill, or other. Dispersing additives can thus be included as desired.

Suitable polymers for use with embodiments of the present invention include all those conventionally used in ordinary printing inks, metal decorating inks and coatings, and other coatings. Such polymers include, but are not limited to, nitrocellulose and modified cellulosics, polyamides, polyesters, polyurethanes, polyacrylates, rosins, modified rosins, and rosin esters and salts, hydrocarbon resins, alkyds, polyolefins, polycarbonates, polyvinyl chlorides, and a range of other systems individually, modified, and in combination.

In printing ink applications, the selection of a solvent is often based on which polymers are used in the inks or coatings, the printing or decorating method, the viscosity of the composition, and the drying parameters. Typical solvents commonly used include alcohols, esters, ketones, aromatic and aliphatic solvents, glycols and glycol ethers, soy, mineral and other oils, water, reactive diluents, monomers, and a range of others. In all these systems the basic potassium aluminum sulfate (BKAS) and/or basic sodium aluminum sulfate (BNaAS) is essentially inert, that is it does not react with nor dissolve in the solvent or polymer.

Additives for the compositions of the present invention include those typically used in printing inks, metal decorating inks and coatings, and other coatings. These are generally included at ten percent or less of each component, in some cases as low as 0.05 percent.

The additives provide a range of properties including scratch resistance, stability, defoaming, wetting, viscosity control, printability, fragrance, etc. Typical additives include, but are not limited to, waxes, silicones, phenolic and other antioxidants, alcohols, surfactants, polymeric materials, dryers, etc. These could be incorporated individually or in combination.

The basic potassium aluminum sulfate (BKAS) and/or basic sodium aluminum sulfate (BNaAS) is essentially inert in the presence of these additives, that is it does not react with nor dissolve in these additives.

FIG. 1 illustrates a process embodiment of the present invention, referred to herein by the general reference numeral 10. The process 10 comprises starting with a leach liquor 12 of $Al_2(SO_4)_3+K_2SO_4+Fe_2SO_4$ and other sulfates. These are introduced to a surface-cooled crystallizer 14 that precipitates crystals of $Al_2(SO_4)_3 \cdot 18H_2O$ that are then removed. The leach liquor is pumped through a heat exchanger 16 that keeps an internal temperature of approximately 160° F. The surface temperature of the surface-cooled crystallizer 14 is maintained at approximately 60° F. For example, the surface-cooled crystallizer 14 may comprise a four-foot diameter twelve-foot high stainless steel tank with a system of chilling pipes that circuit the outside surface.

The surface-cooled crystallizer 14 promotes a supersaturated concentration that causes relatively large and very pure crystals of aluminum sulfate to drop out. A temperature gradient within the leach liquor is contrived thereby to promote such crystal formation. The remaining leach liquor feeds a mixture which includes $K_2SO_4$ in a crystallization and evaporation step 18. A vacuum of twenty inches of mercury and heat combine to evaporate the water and increase the concentration enough to drop a double salt of $Al_2(SO_4)_3+K_2SO_4+24H_2O$. The double salt is then fed to a pressure reactor 20 with a pressure of approximately 250 PSI and a temperature of approximately 200° C.

An excess product of sodium/potassium sulfate 22 is returned to the crystallization and evaporation step 18. The pressure reactor 20 is operated in a discrete continuous process that yields a basic sodium/potassium aluminum sulfate (BNaAS or BKAS) 24, chemically, $Na_2SO_4/K_2SO_4$, $3Al_2O_3$, $4SO_3$, $9H_2O$, and the excess sodium/potassium sulfate 22 $Na_2SO_4/K_2SO_4$ from the $Na_2SO_4/K_2SO_4+Al_2(SO_4)_3+24H_2O$ mixture. The basic potassium aluminum sulfate (BKAS) 24 comprises particles that are at least forty percent below two micron. The basic potassium aluminum sulfate (BKAS) 24 is then fed to a delaminator 26 that converts all the particles to under two micron by mixing and rubbing with three hundred to four hundred micron size alumina. A fine basic sodium/potassium aluminum sulfate (BNaAS or BKAS) 28 is output that has eighty-five percent of its particles under two microns in size.

Figure 2:
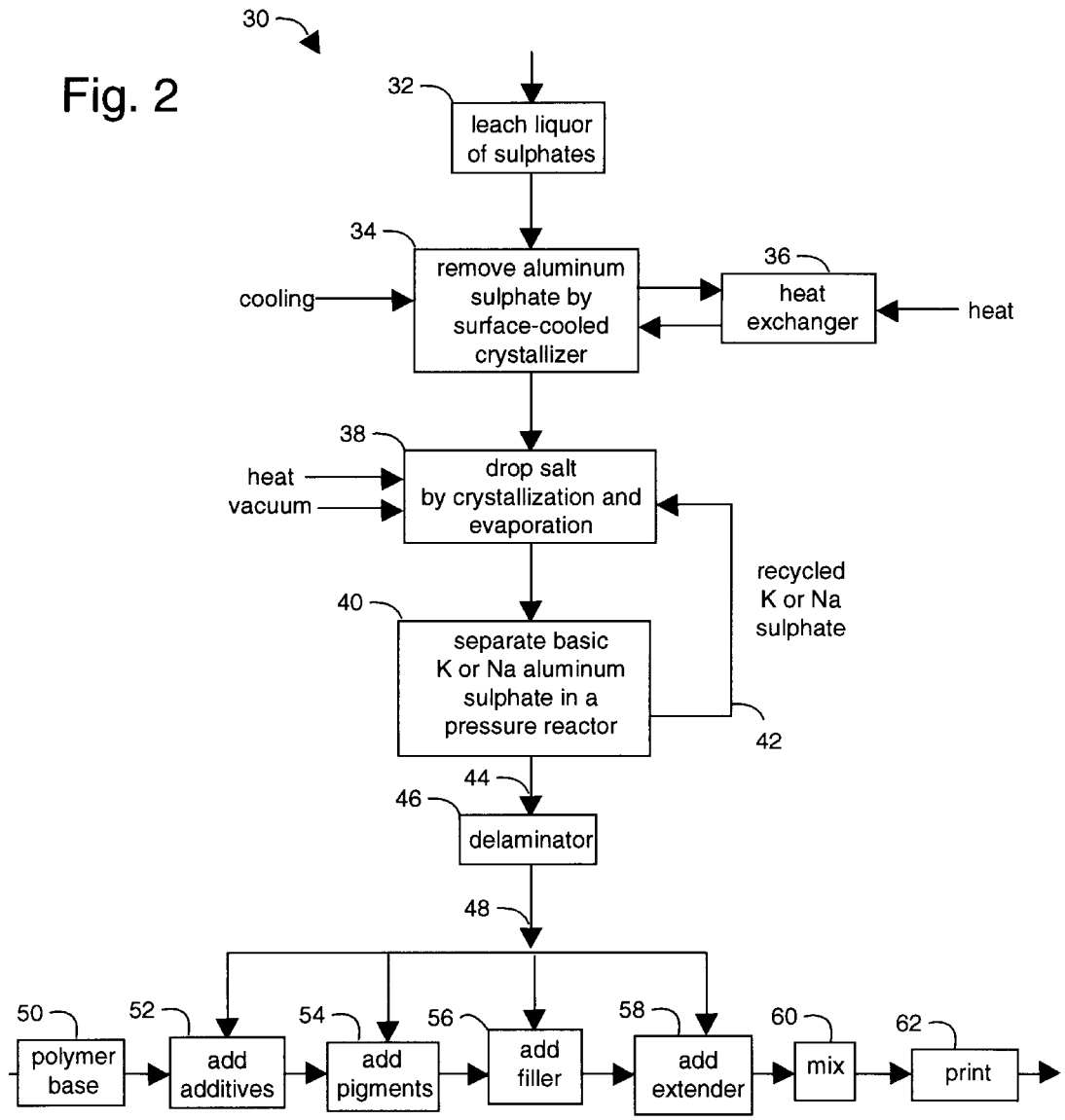

FIG. 2 illustrates an inkmaking process embodiment of the present invention, referred to herein by the general reference numeral 30. The process 30 has a fabrication branch that is similar to the process 10 and a ink fabrication flow to which an additive, pigment, filler, or extender is contributed. The sources of the non-contributed materials can be conventional.

The process 30 comprises starting with a leach liquor 32 of $Al_2(SO_4)_3+K_2SO_4+Fe_2SO_4$ and other miscellaneous sulfates. These are introduced to a surface-cooled crystallizer 34 that precipitates large, very-pure crystals of $Al_2(SO_4)_3 \cdot 18H_2O$ that are then removed. The leach liquor is pumped through a heat exchanger 36 that keeps an internal temperature of approximately 160° F. The surface temperature of the surface-cooled crystallizer 34 is maintained at approximately 60° F. For example, the surface-cooled crystallizer 34 may comprise a four foot diameter twelve-foot high stainless steel tank with a system of chilling pipes that circuit the outside surface.

The surface-cooled crystallizer 34 promotes a supersaturated concentration that causes relatively large and very pure crystals of aluminum sulfate to drop out. A temperature gradient within the leach liquor is contrived thereby to promote such crystal formation. The remaining leach liquor feeds a mixture which includes $K_2SO_4$ in a simple crystallization and evaporation step 38. A vacuum of twenty inches of mercury and heat combine to evaporate the water and increase the concentration enough to drop a double salt of $Al_2(SO_4)_3+K_2SO_4+24H_2O$. The double salt is then fed to a pressure reactor 40 with a pressure of approximately 250 PSI and a temperature of approximately 200° C.

An excess product of sodium/potassium sulfate 42 is returned to the simple crystallization and evaporation step 38. The pressure reactor 40 is operated in a discrete continuous process that yields a basic sodium/potassium aluminum sulfate (BNaAS or BKAS) 44, chemically, $Na_2SO_4/K_2SO_4$, $3Al_2O_3$, $4SO_3$, $9H_2O$, and the excess sodium/potassium sulfate 22 from the $Na_2SO_4/K_2SO_4+3Al_2(SO_4)_3+24H_2O$ mixture. The basic potassium aluminum sulfate (BKAS) 44 comprises particles that are at least forty percent below two micron. The basic potassium aluminum sulfate (BKAS) 44 is then fed to a delaminator 46 that converts all the particles to under two micron by mixing and rubbing with three hundred to four hundred micron size alumina. A fine basic sodium/potassium aluminum sulfate (BNaAS or BKAS) 48 results that has all of its particles substantially under two microns in size.

The ink fabrication flow comprises starting with a polymer base 50. A step 52 adds conventional inkmaking additives to the ink. A step 54 adds pigments to the ink. A step 56 adds a filler to the ink. A step 58 adds an extender. Thus, the BKAS or BNaAS 48 can be used in any and all steps 52, 54, 56, and 58. All are mixed in a step 60. Alternatively, the ink product is used in a printing in a step 62.

In alternative embodiments of the above, sodium (Na) may be substituted in whole or part for sodium/potassium (K) with substantially similar benefits and results. Such basic sodium aluminum sulfate (BNaAS) $Na_2SO_4$, $3Al_2O_3$, $4SO_3$, $9H_2O$ is also referred to herein as sodium double salt (SDS). The basic formula for the SDS is $Na_2SO_4 \cdot 3Al_2O_3 \cdot 4SO_3 \cdot 9H_2O$ with a molecular weight of 930.03. The hydrolysis equation is, $$3[Na_2Al_2(SO_4)_4 \cdot 24H_2O] <-> Na_2SO_4 \cdot 3Al_2O_3 \cdot 4SO_3 \cdot 9H_2O + 5H_2SO_4 + 2Na_2SO_4 + 58H_2O$$

When the SDS was converted to basic sodium aluminum sulfate (BNaAS) $Na_2SO_4$, $3Al_2O_3$, $4SO_3$, $9H_2O$, the resulting material exhibited many of the same properties as basic potassium aluminum sulfate (BKAS). A very high conversion was obtained compared to basic potassium aluminum sulfate (BKAS) basic sodium aluminum sulfate (BNaAS), eighty-three percent by weight; basic potassium aluminum sulfate (BKAS), seventy-five percent by weight). The particle size of the basic sodium aluminum sulfate (BNaAS) was similar to the basic potassium aluminum sulfate (BKAS). Both the basic sodium aluminum sulfate (BNaAS) and the basic potassium aluminum sulfate (BKAS) required delamination. The solubility of basic sodium aluminum sulfate (BNaAS) is very low, e.g., 0.003 gram per 100 grams of deionized water. The solubility of basic potassium aluminum sulfate (BKAS) 0.005 gram per 100 grams of de-ionized water. The basic sodium aluminum sulfate (BNaAS) product was very pure, with the contamination being mainly sodium/potassium, e.g., from the basic potassium aluminum sulfate (BKAS). Any sodium/potassium in the reactor will potentially react to form basic potassium aluminum sulfate (BKAS). The process produced a product with basic potassium aluminum sulfate (BKAS) levels that varied with the sodium/potassium level in the sodium alum feed crystals.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for making ink including a first basic sodium/potassium aluminum sulfate (BNaNS or BKAS):

starting with a leach liquor that is essentially saturated with aluminum sulfate $Al_2(SO_4)_3$ and sodium/potassium sulfate $Na_2SO_4/K_2SO_4$;

introducing said leach liquor to a surface-cooled crystallizer;

precipitating and removing crystals of aluminum sulfate $Al_2(SO_4)_3 18H_2O$ from said leach liquor in said surface-cooled crystallizer;

precipitating the double salt of $Al_2(SO_4)_3+K_2SO_4+24H_2O$ by concentrating the residual of said leach liquor with heat, vacuum and evaporation;

reacting said double salt of $Al_2(SO_4)_3+K_2SO_4+24H_2O$ in a heated and pressurized reactor to produce a first basic sodium/potassium aluminum sulfate (BNaS or BKAS) having a first general particle size distribution that includes particles which exceed two microns;

delaminating said first basic sodium/potassium aluminum sulfate to produce a second basic potassium aluminum sulfate with particle sizes that do not exceed two microns; and mixing said delaminated material with an ink.

2. The method of claim 1, wherein:

the delaminating includes the use of a delaminator that rubs three hundred to four hundred micron sized particles of alumina or silica with said first basic sodium/potassium aluminum sulfate (BNaAS or BKAS) and then separates out said basic potassium aluminum sulfate (BKAS) to yield said second basic sodium/potassium aluminum sulfate (BNaAS or BKAS).

3. The method of claim 1, wherein the precipitating and removing crystals of aluminum sulfate further comprise the steps of:

pumping said leach liquor through a heat exchanger that keeps an internal temperature of approximately 160° F. and through a surface-cooled crystallizer wherein the surface temperature of the surface-cooled crystallizer is maintained at approximately 60° F.

4. The method of claim 1, wherein:

the precipitating and removing crystals of aluminum sulfate is such that said surface-cooled crystallizer comprises a tank with a system of chilling pipes that circuit the outside surface to establish a lateral temperature gradient orthogonal to the vertical within said tank and leach liquor.

5. A method for making ink or an ultra-violet opaque protectorant coating with a first basic sodium/potassium aluminum sulfate (BNaAS or BKAS) comprising:

starting with a leach liquor of at least aluminum sulfate $Al_2(SO_4)_3$ and sodium/potassium sulfate $Na_2SO_4/K_2SO_4$;

introducing said leach liquor to a surface-cooled crystallizer;

precipitating and removing crystals of aluminum sulfate $Al_2(SO_4)_3$ $18H_2O$ from said leach liquor in said surface-cooled crystallizer;

precipitating a double salt of $Al_2(SO_4)_3+K_2SO_4+24H_2O$ by concentrating a remainder of said leach liquor with heat, vacuum and evaporation;

reacting said double salt of $Al_2(SO_4)_3+K_2SO_4+24H_2O$ in a heated and pressurized reactor to produce a first basic sodium/potassium aluminum sulfate (BNaAS or BKAS); and adding said BNaAS or BKAS to at least one of a colorant, polymer, solvent, and additive to form one of an ink or ultra-violet opaque protectorant coating.

* * * * *